US007869821B2

(12) United States Patent
Legrand et al.

(10) Patent No.: US 7,869,821 B2
(45) Date of Patent: Jan. 11, 2011

(54) ENHANCEMENT OF SIGNALLING IN A "PUSH TO TALK" TYPE COMMUNICATION SESSION BY INSERTION OF A VISITING CARD

(75) Inventors: Patrick Legrand, Epinay-sur-Orge (FR); Johann Daigremont, Bagneux (FR)

(73) Assignee: Alcatel Lucent, Paris (FR)

( * ) Notice: Subject to any disclaimer, the term of this patent is extended or adjusted under 35 U.S.C. 154(b) by 641 days.

(21) Appl. No.: 11/872,138

(22) Filed: Oct. 15, 2007

(65) Prior Publication Data

US 2008/0096599 A1    Apr. 24, 2008

(30) Foreign Application Priority Data

Oct. 18, 2006    (FR)    .................................. 06 54332

(51) Int. Cl.
*H04W 4/10*    (2009.01)
*H04W 84/08*    (2009.01)
(52) U.S. Cl. ........................ 455/518; 455/520; 455/566
(58) Field of Classification Search ....................... None
See application file for complete search history.

(56) References Cited

U.S. PATENT DOCUMENTS

| 2004/0219925 | A1* | 11/2004 | Ahya et al. | ............. | 455/509 X |
|---|---|---|---|---|---|
| 2006/0040686 | A1 | 2/2006 | Lee | | |
| 2006/0046755 | A1 | 3/2006 | Kies | | |
| 2006/0121927 | A1 | 6/2006 | Joung | | |

\* cited by examiner

*Primary Examiner*—Philip J Sobutka
(74) *Attorney, Agent, or Firm*—Harness, Dickey & Pierce

(57) ABSTRACT

SIP type signal protocol for a mobile communication network (N), comprising an invitation signal message (MI) "INVITE", intended to set-up a "Push to Talk" type communication session between a calling communication client (A) and one or several called communication clients (B, C), and containing the logical address of the calling communication client and an address of the called communication client(s).

The signal protocol is innovative in that the invitation signal message (MI) also contains a visiting card associated with a user of the calling communication client (A).

12 Claims, 1 Drawing Sheet

FIG_1
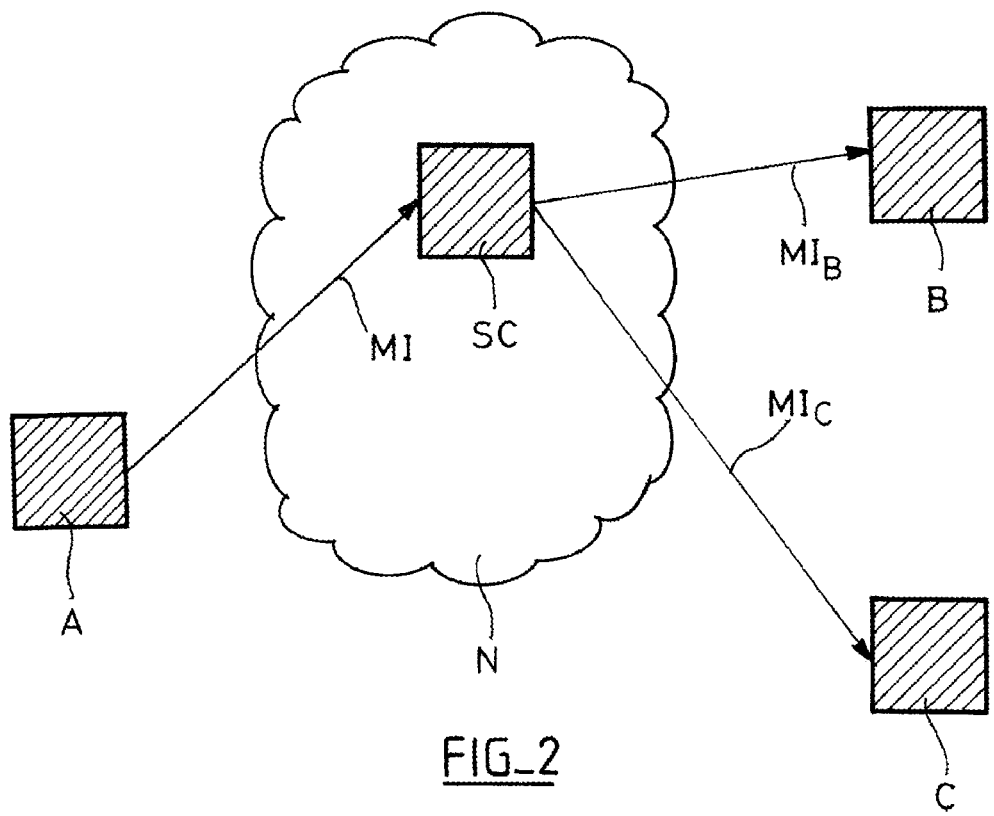
FIG_2
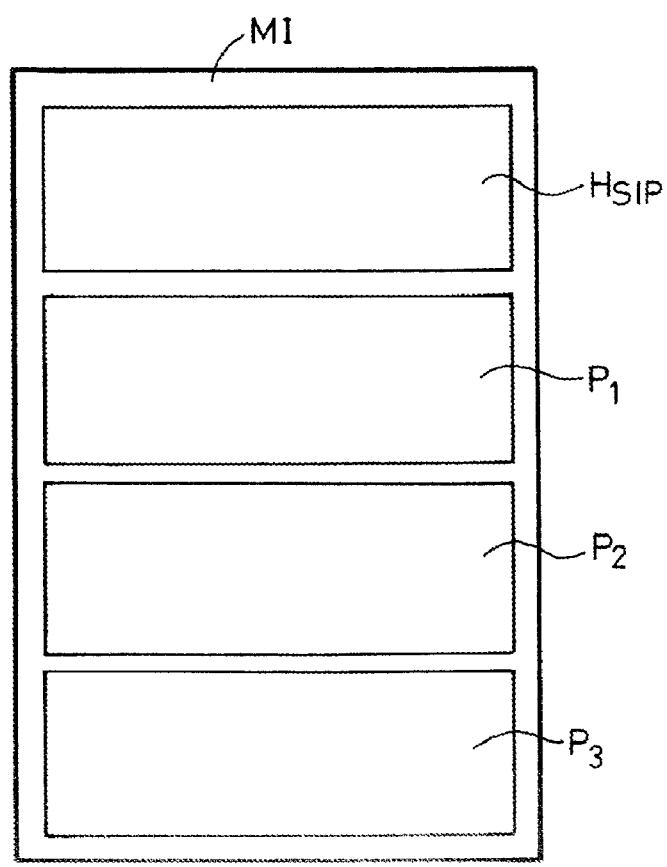

ENHANCEMENT OF SIGNALLING IN A "PUSH TO TALK" TYPE COMMUNICATION SESSION BY INSERTION OF A VISITING CARD

This invention relates to communication networks. More precisely, it relates to an invitation by a communication client of one or several other communication clients to set up a communication session, particularly a "PoC" ("Push to talk over Cellular") type session.

The "Push to Talk" (PTT) service is a communication service of the "half duplex" type that enables the parties to interactively and non-simultaneously communicate with each other. A control (button, key, etc.) for each client is used to switch the client from reception mode to transmission mode and vice-versa.

This service has been adapted for cellular communication networks and is therefore referred to by the acronym PoC ("Push to talk over Cellular").

Such a service is currently promoted by the OMA (Open Mobile Alliance). For example, it is described and specified in the "Push to talk over Cellular (PoC)—Architecture" (OMA-AD_PoC-V1_0-20060609-A), and "OMA PoC Control Plane" (OMA-TS-PoC-ControlPlane-V1_0-20060609-A) documents. These two documents were published on Jun. 9, 2006.

According to these standard specifications, a client who wants to initiate a "PoC" type communication session transmits an invitation message to a PoC communication server.

This invitation message is an SIP "Invite" request. This request type is specified principally in the (Internet Engineering Task Force) RFC 3261 entitled "Session Initiation Protocol".

The invitation message contains the logical address called the URI ("Uniform Resource Identifier") of the client sending the invitation, and of the destination client(s) (in other words the clients that the sender would like to invite to the "PoC" communication session).

One of the roles of the PoC communication server is to transmit the invitation received from the sending (or calling) client to the invited (or called) clients, using addresses contained in the invitation message.

The invited client is typically a mobile communication terminal, and particularly a cellular terminal. It has a display means usually consisting of a screen, on which information about the invitation can be displayed. The communication client user can decide whether or not to accept the invitation, depending on this information.

OMA specifications do not describe the information transferred by invitation messages in any detail. The SIP protocol specifies a set of headers. These headers transmit the logical address (URI) of the calling client. Therefore the invited communication client can display this logical address on his screen. If the user corresponding to this logical address is known to the called user, he can form part of a directory and information contained in this directory can be displayed in addition to or instead of the logical address.

For example, one possibility is described in patent application US2005/0287997. This information, external to the standardization work done by the OMA, describes a solution in which information about the caller ID is inserted into signal messages and associated with an address book by the called communication client so as to display additional information to the user.

However, this state of the art is not very satisfactory.

In the first case, a logical address may not be sufficient for the user to make an informed decision about whether or not to accept the invitation to a communication session. A logical address is not necessarily very easily readable (it does not necessarily correspond to the calling client's user name).

For the second situation, in which the logical address is associated with information stored by the client locally, it is impossible to use it except in the case in which the invitation message is from a previously known correspondent. It does not apply to the case of a new correspondent and in this case does not provide any information to assist the called user in making the decision.

Solutions have also been developed to enable transmission of additional information in a PoC application. For example, this may consist of solutions described in patent applications US2006/0046755, US2006/0121927 and US 2006/0040686, that describe means of transmitting images during a "PoC" session.

However, these developments do not enable transmission of additional information that called clients can use to decide whether or not to accept the invitation to a communication session.

In patent US 2006/0040686, for example, setting up the communication session remains conforming to the state of the art and the called client cannot receive an image from a server until he has accepted the call and the session has been set up.

Therefore, he cannot take advantage of this image to decide whether or not to accept the incoming call.

Consequently, there is a need to improve the state of the art so that called clients can have the necessary information to decide whether or not to accept an invitation to a "PoC" ("Push to talk over Cellular") type communication session.

The first purpose of this invention is a communication client with:
  a sound production circuit to produce a sound signal representative of data received on a down communication channel and a sound acquisition circuit to produce data to be transmitted on an up communication channel,
  a signal interface capable of transmitting signal messages on a signal channel. Some of these signal messages are intended to set up a communication session with one or several other communication clients,
  a man-machine interface comprising means of controlling this signal interface, and when a "Push to Talk" type communication session has been set up, means of changing over between a transmission mode in which the microphone is active, and a reception mode in which the microphone is not active,
  display means designed to display information based on data contained in some received signal messages.

The communication client according to the invention is innovative in that:
  it is also provided with a memory designed to store a visiting card associated with a user of the communication client, and designed to be transmitted to the communication client(s) by one or several signal messages, and in that
  the display means are designed to completely or partially display visiting cards contained in the received signal messages.

According to one embodiment of the invention, the signal interface may comply with the SIP protocol and it may be designed to transmit the visiting card in an "Invite" signal message designed to set up the communication session with one or several other communication clients.

The visiting card may be inserted into an SDP part of the "Invite" signal message.

According to one embodiment of the invention, the visiting card may comply with the "vCard" format.

Optionally, the memory provided to store a visiting card may also be used to store a set of visiting cards each associated with a user or a user profile, and the communication client has means of determining one visiting card among this set prior to transmission of this visiting card in a signal message.

The second purpose of the invention is a signal protocol for a mobile communication network, comprising an invitation signal message intended to set-up a "Push to Talk" type communication session between a calling communication client and one or several called communication clients. This signal message contains the logical address of the calling communication client and an address of the called communication client(s).

According to the invention, the signal protocol is innovative in that the invitation signal message also contains a visiting card associated with a user of the calling communication client.

According to one embodiment of the invention, the invitation signal message is transmitted by the calling communication client to a communication server designed to transmit it to called communication client(s) depending on the address (es) contained in it.

According to one embodiment of the invention, the signal message may be a multi-party "Invite" message conforming to the SIP standardization in which the visiting card is contained in a part conforming to the SDP protocol.

Optionally, this visiting card may comply with the vCard format.

Another purpose of the invention is a software product containing a code designed to implement the communication protocol according to the invention. Such a code may possibly be downloaded from an application server onto communication clients.

The invention and its characteristics will become clearer after reading the description of embodiments given below.

FIG. 1 diagrammatically shows a communication network for use of the invention.

FIG. 2 diagrammatically shows a signal message according to the invention.

In the example in FIG. 1, a communication client A can communicate with a mobile communication network N. This mobile communication network is typically a cellular network of the GSM, UMTS, CDMA type, etc. It may be a convergent network comprising a mobile subnetwork and a fixed subnetwork that enables fixed and mobile communication clients to communicate together. Such a network may comply with the IMS (Internet Multimedia Subsystem) architecture standardised by 3GPP and TISPAN.

The communication client N can communicate with one or several other communication clients B, C through this communication network N.

In a manner known in itself, a communication terminal can be connected to the communication network through an up channel to transmit data (voice, video, etc.) from the communication client user, to the communication network N; a down channel for reception of data from the network (and generally indirectly from another communication client); and a signal channel used for two-directional transmission of signal messages between the communication client and the network N.

Communication clients are typically communication terminals provided with sound production and acquisition circuits for setting up a "voice" type communication session. They may also be provided with more advanced means such as screens, cameras, etc., for setting up a multimedia communication session (video, etc.).

The sound production circuit is typically a loud speaker or a headset for producing a sound signal representative of data received on the down communication channel.

The sound acquisition circuit is typically a microphone designed to produce data that are then transmitted to the communication network through the up communication channel.

Communication clients A, B, C also have signal interfaces to send and receive signal messages on the signal channel, connecting them to the communication network N.

These signal interfaces may comply with the SIP protocol as defined in RFC 3261 of the IETF (Internet Engineering Task Force) and possibly with extensions to this SIP protocol defined later by the IETF or other standardisation organisations.

The communication client A sends an invitation signal message MI to the communication network N, so as to set up a "PoC" type communication session ("Push to talk over Cellular").

The communication client A has a man-machine interface that comprises means of ordering the signal interface and triggering transmission of this invitation signal message MI. This man-machine interface is typically composed of a set of keys, possibly in addition to a touch screen, thumbwheels, etc., that the user can use to order and control the communication client. Therefore, the user can use this man-machine interface to trigger initiation of a "PoC" type communication session.

This particular man-machine interface also has means (keys, thumbwheels, etc.) of changing over between a reception mode and a transmission mode, once a "Push to Talk" communication session has been set up. The sound acquisition circuit is inactive in reception mode. The sound production circuit is usually inactive in transmission mode.

The invitation signal message MI may be transmitted to a communication server SC within the communication network. This communication server can understand the content of the invitation signal message MI and, depending on this content, it can transmit it to the called communication clients B and C.

FIG. 2 diagrammatically shows an invitation signal message conforming to the SIP protocol and the OMA standard specifications for a "PoC" service.

This invitation signal message MI is then an "INVITE" message defined by the IETF RFC 3261.

It comprises a first part ESIP formed by set of SIP headers. These headers contain at least the logical address of the user of the communication client A. They also contain information for routing the invitation message as far as the communication server SC.

The "INVITE" signal message also contains a part P1 containing information describing the set up communication session and used by the different parties to negotiate these parameters. These parameters may for example relate to encoding of media flows to be used, etc.

In a manner known in itself, this part complies with the SDP ("Session Description Protocol") protocol.

The signal message MI also contains a part P2 also conforming to this SDP protocol, as specified in the standard documents mentioned above issued by the OMA. This part P2 contains the logical addresses of the invited communication clients.

The code given below is an illustrative example of an invitation signal message conforming to the SIP protocol and the OMA specifications. The first extract represents ESIP headers of this invitation message. The bold words represent keywords in the SIP protocol grammar and have only been shown in bold to facilitate legibility.

Note the "Content-Type: multipart/mixed" header that means that the invitation message MI is a "multi-party" message, comprising several parts conforming with the SDP protocol (P1 and P2, and P3 that will be described later).

```
SIP INVITE request
Request-URI sip:PoCConferenceFactoryURI.networkA.net
P-Preferred-Identity: "PoC User A" <sip:PoC-UserA@networkA.net>
Accept-Contact: *;+g.poc.talkburst; require;explicit
User-Agent: PoC-client/OMA1.0 Acme-Talk5000/v1.01
Privacy: id
Contact: <sip: PoC-ClientA.networkA.net>;+g.poc.talkburst
Supported: timer
Session-Expires: 1800;refresher=uac
Allow: INVITE,ACK,CANCEL,BYE,REFER,MESSAGE,SUBSCRIBE,
NOTIFY,PUBLISH
Content-Type: multipart/mixed
P-Alerting-Mode: MAO
```

Part P1 conforming to the SDP protocol may be shown in the following form:

```
Content-Type: application/sdp
c= IN IP6 5555::aaa:bbb:ccc:ddd
m= audio 3456 RTP/AVP 97
a= rtpmap:97 AMR
a= rtcp:5560
m= application 2000 udp TBCP
a= fmtp:TBCP queuing=1; tb_priority=2; timestamp=1
```

Part P2 also conforming to the SDP protocol may be shown in the following form:

```
Content-Type: application/resource-lists+xml
Content-Disposition: recipient-list
<?xml version="1.0" encoding="UTF-8"?>
<resource-lists xmlns="urn:ietf:params:xml:ns:resource-lists"
xmlns:xsi="http://www.w3.org/2001/XMLSchema-instance">
<list>
<entry uri="sip:PoC-UserB@networkB.com" />
<entry uri="sip:PoC-UserC@networkC.com" />
</list>
</resource-lists>
```

As described above, this part P2 contains addresses of called communication clients B, C ("sip:PoC-UserB@networkB.com" and "sip:PoC-UserC@networkC.com").

The communication server SC is designed to transmit this invitation signal message MI to communication clients B and C as a function of the addresses ("sip:PoC-UserB@networkB.com" and "sip:PoC-UserC@networkC.com") contained in this message. Therefore in the example shown in FIG. 1, the message MI is duplicated into a message MIB transmitted to the communication client B and a message MIC transmitted to the communication client C.

Furthermore, according to the invention, a part P3 is also inserted in the invitation signal message MI sent by the calling communication client A.

This part P3 contains a user's visiting card. It may be stored before in a memory specifically provided for this purpose within the communication client. The communication client can then be designed to automatically insert this visiting card stored in the sent invitation signal messages. A user confirmation may be requested, or a configuration option of this communication client may be used for this automatic insertion.

If a particular communication client could be used by several different users, the memory may store several visiting cards. In this case, the visiting card to be transmitted can be determined automatically when the user makes the connection to the communication client ("login").

Possibly, several different visiting cards may be provided and stored for a particular user corresponding to different profiles, for example a business card, an individual visiting card, etc.

In all cases, the communication client is provided with means of determining one visiting card among the set of stored visiting cards, before the transmission in a signal message MI.

This visiting card may comply with the vCard format. This vCard format has the merit that it is widely used in emails and thus facilitates interoperability between invitation messages and emails and between applications and services using them.

This vCard ("Versitcard") format is normalised in version 3.0 by the IETF's RFC 2425 and 2426, called "A MIME Content-Type for Directory Information" and "vCard MIME Directory Profile" respectively.

Obviously, other visiting card specifications are possible, while remaining within the scope of the invention.

The visiting card may contain different items of information about the user of the communication client: his pseudonym or family name, his email, his physical address, telephone numbers, his title and/or professional function, etc.

This part P3 that contains the visiting card may be as follows, in accordance with the SDP protocol:

```
Content-Type: application/x-vcard
begin:vcard
fn:Smith
n::Smith;Bob
org:Alcatel;
adr:;;Route de Nozay;Marcoussis;;F-91461 Cedex;France
email;internet:Bob.Smith@alcatel.fr
tel;work:+33 (0)1 69 63 xx xx
tel;fax:+33 (0)1 69 63 xx xx
version:2.1
end:vcard
```

This part P3 contained in the signal message MI is maintained in the signal messages MIB and MIC transmitted by the communication server SC to communication clients B and C respectively.

The communication servers B and C are provided with display means, and particularly a screen. The information contained in the visiting card can then be displayed partially or entirely on the screen. They thus provide the user of the called communication clients with additional information to decide whether or not to accept the invitation.

Some information may be displayed automatically (caller names, etc.), while other information will only be displayed following a specific action by the user (address, etc.). This separation may be dependent on the size of the display screen.

Even if the user of communication client B or C does not know the user of communication client A, he can thus be informed about his name, company, address, etc, and this information may be sufficient for him to make a decision. He can thus filter some incoming calls and possibly set aside unwanted "spamming" type invitations.

He can also mentally and physically prepare himself for an incoming call (by taking out a file, documentation, etc.).

This visiting card received by a communication client may optionally be stored in a memory provided for this purpose and managed by an "address book" type application. This storing and this application enable a user to manage contacts and keep a trace of these contacts.

According to one embodiment of the invention, the visiting cards may also be transmitted by signal messages other than invitation signal messages.

For example, signal messages may be transmitted by a called communication client B to the calling communication client A and/or to the other called communication client C. These signal messages containing the visiting card of the user of communication client B enable communication clients A and C to know this personal information and possibly to store this visiting card among their contacts.

The invention claimed is:

1. A communication client, comprising:
   a sound production circuit configured to produce a sound signal representative of data received on a down communication channel;
   a sound acquisition circuit configured to produce data to be transmitted on an up communication channel;
   a signal interface configured to transmit and receive signal messages (MI) on a signal channel, some of said signal messages being invitation messages, intended to set up a communication session with one or several other communication clients;
   a man-machine interface configured to control said signal interface, and when a "Push to Talk" type communication session has been set up, configured to change over between a transmission mode in which a microphone is active and a reception mode in which the microphone is not active;
   a display configured to display information based on data contained in some received signal messages;
   a memory designed configured to store a visiting card associated with a user of said communication client, and wherein
   the signal interface is configured to transmit the visiting card to said other communication client(s) by one or several invitation messages to set up a communication session, and the display is configured to completely or partially display a visiting card contained in a received signal message.

2. Communication client according to claim 1, in which said signal interface complies with the SIP protocol and is designed to transmit said visiting card in an "Invite" signal message designed to set up said communication session with one or several other communication clients.

3. Communication client according to claim 2, in which said visiting card is inserted into an SDP part of said "Invite" signal message.

4. Communication client according to claim 3, in which said visiting card complies with the "vCard" format.

5. Communication client according to claim 4, in which said memory is configured to store a set of visiting cards, each associated with a user and a user profile, and also having means of determining one visiting card among said set prior to transmission of this visiting card in the signal message (MI).

6. Communication network using a communication client complying with claim 1.

7. Communication client, provided with means of connecting to a communication network and transmitting invitation signal messages for setting up a communication session with at least one other communication client, and display means designed to display information based on data contained in some of the received signal messages, and wherein
   a memory is configured to store a visiting card associated with a user of said communication client, and the visiting card designed to be transmitted to said other communication client(s) by one or several invitation messages sent from the communication client, and said display means are designed to completely or partially display the visiting cards contained in said received signal messages.

8. A method of initiating a push-to-talk communication, comprising:
   sending, from a communication client, an invitation to establish a push-to-talk communication session, the invitation including a visiting card associated with a user of the communication client.

9. The method of claim 8, wherein the invitation is a SIP "Invite" signal message.

10. The method of claim 9, wherein the sending step inserts the visiting card into an SDP part of the "Invite" signal message.

11. The method of claim 8, wherein the visiting card complies with the "vCard" format.

12. The method of claim 8, further comprising:
    storing a set of visiting cards, each associated with a user and a user profile,
    determining one visiting card among the set prior to the sending step; and wherein
    the sending step sends the determined visiting card in the invitation.

* * * * *